United States Patent [19]

Kishine et al.

[11] Patent Number: 4,661,402

[45] Date of Patent: Apr. 28, 1987

[54] MAGNETIC RECORDING MEDIUM

[75] Inventors: Nobuyuki Kishine; Tetsuya Imamura, both of Tochigi; Michihide Yamauchi, Wakayama; Takashi Takeuchi, Tochigi, all of Japan

[73] Assignee: KAO Corporation, Tokyo, Japan

[21] Appl. No.: 647,849

[22] Filed: Sep. 6, 1984

[30] Foreign Application Priority Data

Sep. 7, 1983 [JP] Japan ................... 58-164677

[51] Int. Cl.$^4$ ............................. G11B 5/708
[52] U.S. Cl. .................... 428/323; 252/62.54; 427/128; 428/408; 428/328; 428/329; 428/694; 428/695; 428/900
[58] Field of Search ............... 428/694, 408, 323, 695, 428/900, 329, 328; 427/129, 131, 132, 128; 360/134–135; 252/62.54

[56] References Cited

U.S. PATENT DOCUMENTS

| | | | |
|---|---|---|---|
| 2,188,667 | 1/1940 | Stoelzle | 428/408 |
| 3,854,979 | 12/1974 | Rossi | 428/408 |
| 4,546,038 | 10/1985 | Yamaguchi | 428/694 |
| 4,556,604 | 12/1985 | Ohbayashi | 428/323 |
| 4,578,313 | 3/1986 | Ito | 428/900 |

FOREIGN PATENT DOCUMENTS

| | | | |
|---|---|---|---|
| 119932 | 9/1981 | Japan | 428/323 |
| 063029 | 4/1984 | Japan | 428/323 |

OTHER PUBLICATIONS

DCIC Report 68-2, Apr. 1968, "A Review of Glasslike Carbons", by Dr. Shigehiko Yamada.

*Primary Examiner*—Ellis P. Robinson
*Attorney, Agent, or Firm*—Cushman, Darby & Cushman

[57] ABSTRACT

A magnetic recording medium exhibiting reduced abrasion and improved lubricant properties comprising a non-magnetic substrate having a magnetic layer containing a magnetic powder thereon, the magnetic layer including a glasslike carbon powder having an average particle diameter of from 0.1 to 2.0 $\mu$m present in an amount of from 0.5 to 15 parts by weight per 100 parts by weight of the magnetic powder.

4 Claims, No Drawings

MAGNETIC RECORDING MEDIUM

BACKGROUND OF THE INVENTION

This invention concerns a magnetic recording medium used for magnetic recording and reproduction devices, particularly audio and video record/playback devices.

In order to improve the anti-abrasion and lubrication properties of a magnetic coating film on the magnetic recording medium used for conventional magnetic recording and reproduction devices, a lubricant, such as ester of fatty acid or fatty acid amide, and abrasive grains of a higher Moh's hardness are conventionally added to the magnetic layers. This method can considerably improve the anti-abrasion properties of the magnetic coating film but abrasive grains accelerate wear and tear of a magnetic head often to an unacceptable level. Further, even if a lubricant is added, the lubricating effect will be lost due to evaporation or dissipation as time elapses. It is necessary to design a method to gradually transfer the lubricant into the magnetic coating layer in order to overcome such problems; however, it is extremely difficult to control the amount of transferring lubricant. The desired lubrication effect is, moreover, easily adversely affected by the environment, particularly by moisture.

In the past, methods have been proposed for improving the anti-abrasion and lubricant properties of the magnetic coating film on the magnetic recording medium. Examples of such methods are described in one or more of the following Japanese Laid-Open patent applications (JPA): 57-162127 entitled "A method for making abrasive particles of 6 or higher Moh's hardness and needle-like iron oxide coexist"; JPA Laid-Open No. 57-150131 for "A method of adding to a magnetic layer carbon black of 30 $\mu$m average particle diameter and needle-like non-magnetic powder"; JPA Laid-Open No. 57-162128 for "A method of using abrasive of 6 or higher Moh's hardness, colloidal $SiO_2$, fatty acid, and esters of fatty acid together"; and JPA Laid-Open No. 57-123527 for "A method of using polyethylene wax and molybdenum disulfide or powder of flurorine containing resin together". Despite these numerous and detailed suggestions in the art, such proposals have not quite satisfactorily improved the anti-abrasion and lubrication properties of a magnetic coated layer.

An object of the present invention is to provide a magnetic recording medium which has superior anti-abrasion and lubricant properties in the magnetic coated layer, the lubrication of which lasts and is effective for a long period of time, excellent properties which are not easily affected by environmental changes, the magnetic head which is contacted by the magnetic recording medium is not easily worn, and which has less jitter (jitters cause phase shift of the pulses resulting in blurring of the screen image) and less sliding noise as the medium traverses the recording head and other mechanical tape-handling components of the record/playback device.

DETAILED DESCRIPTION OF THE INVENTION

This invention is characterized in that a magnetic layer used for a magnetic recording medium in magnetic recording and reproduction devices contains, in addition to the magnetic powder particles, resin binder and other ingredients, from 0.5–15 parts by weight of a glasslike carbon powder, the particles of which have an average particle diameter of 0.1–2.0 $\mu$m.

The glasslike carbon as mentioned herein may be a glasslike carbon obtained by carburizing a thermosetting resin, a glasslike carbon obtained by carburizing a resin which has been modified to cause it to be thermosetting by copolymerization or co-polycondensation, a glasslike carbon obtained by chemical treatment which excessively prevents crystallization in the step of hardening or carburizing, and a glasslike carbon obtained by thermal cracking in gas phase low molecular weight hydrocarbons such as methane, ethylene, benzene, etc. More specifically, it may be vitreous carbon of polyacrylonitrile origin, of rayon origin of pitch origin, of lignin origin, of phenol origin, of furan origin, of alkyd resin origin, of unsaturated polyester origin, or of xylene resin origin.

The glasslike carbon powder used in the present invention having an average particle diameter of 0.1–2.0 $\mu$m can be obtained by crushing a mass or a sheet of glasslike carbon by physical means, such as a hammer mill, a crusher, a jet mill, a sand mill, a ball mill, etc. Alternately, powder may be obtained by crushing hardened resin which is a precursor of glasslike carbon, by physical means such as mentioned above, classifying the resulting crushed powder to obtain the desired particle size, and carbonizing. Alternatively, the powder may be obtained by spraying and drying glasslike carbon in liquid form to obtain hardened particles and then carbonizing the particles.

The magnetic recording medium according to the present invention may be manufactured by conventional processing techniques, including the steps of mixing and kneading a magnetic powder, the glasslike carbon of 0.1–2.0 $\mu$m average particle diameter, a binder, an organic solvent and a dispersing agent, and, if necessary, an antistatic agent, an abrasive or a lubricant to obtain a magnetic paint and then coating the magnetic paint on a non-magnetic substrate, drying and finishing the surface to a mirror-like surface.

The magnetic powder herein described may be any one of a number of commercially available magnetic powders suited for the particular end use of the recording medium. Such powders include needle-like metal oxides such as $\gamma$-$Fe_2O_3$, $Fe_3O_4$, $CrO_2$, Co coated $\gamma$-$Fe_2O_3$, Co doped $\gamma$-$Fe_2O_3$ or other treated $\gamma$-$Fe_2O_3$ oxides, metallic powders of iron, magnetic powders in minute plate form of barium ferrite and barium ferrite in which a part of the Fe atoms are substituted by one or two of Ti, Co, Zn, V, Nb atoms, super fine powders of Fe, Co, Fe+Co, Fe+Ni, Ni+Co or an alloy thereof, a Beltholide compound of $\gamma$-$Fe_2O_3$ and $Fe_3O_4$, Co+-Ni+P alloy, and other known ferro-magnetic powders. The nature of the magnetic powder itself is not critical so long as when the glasslike carbon particles are incorporated the results of the invention are achieved.

The binder used herein may be any known thermoplastic resin, thermosetting resin, reactive resin or a mixture thereof as conventionally used in the manufacture of magnetic recording media.

The thermosetting resin ussed herein may be a thermosetting resin or a mixture of thermosetting resins having a setting temperature of 150° C. or less, a mean molecular weight of 10,000–200,000, a polymerization degree of about 200–2,000. An illustrative but nonexhaustive list of suitable resins include copolymers of vinyl chloride and vinyl acetate, copolymers of vinyl chloride and vinylidine chloride, copolymers of vinyl chloride and acrylonitrile, copolymers of acrylic ester and acrylonitrile, copolymers of acrylic ester and vinylidene chloride, copolymers of acrylic ester and styrene, copolymers of methacrylic ester and acrylonitrile, copolymers of methacrylic ester and vinylidene chloride, copolymers of methacrylic ester and styrene, urethane elastomers, polyflurovinyls, copolymers of vinylidene chloride and acrylonitrile, copolymers of butadiene and acrylonitrile, polyamide resins, polyvinyl butyral, cellulose derivatives (such as cellulose acetate butyrate, cellulose diacetate, cellulose triacetate, cellulose propionate and nitrocellulose), copolymers of styrene and butadiene, polyester resins, copolymers of chlorovinyl ether and acrylic ester, amino resins, and various thermosetting resins of the synthetic rubber group as well as mixtures of two or more such resins.

The thermosetting resin or reactive resin used herein in a solution form has a molecular weight of 200,000 or less which can be increased indefinitely by condensation or addition if a binder is added after coating and drying. Among such resins, preferred are those which are not softened or melted until the time the resin has been thermo decomposed. More specifically, the selected resin may be a phenol resin, epoxy resin, polyurethane setting resin, urea resin, melamine resin, alkyd resin, silicone resin, a reactive resin of the acrylic type, a mixture of a high polymer polyester resin and an isocyanate prepolymer, a mixture of a methacrylate copolymer and a diisocyanate prepolymer, a mixture of a polyester polyol and a polyisocyanate, a ureaformaldehyde resin, a mixture of low molecular glycol/high molecular diol/triphenyl methane triisocyanate, a polyamine resin or a mixture thereof. These binders may be used singly or combined.

The mixing ratio by weight of the binder and the magnetic powder may be 10–400 parts by weight of the binder against 100 parts by weight of magnetic powder, and preferably is 30–200 parts by weight calculated on 100 parts by weight of the magnetic powder.

The organic solvent used to prepare the magnetic paint is not critical and is selected from a range of known solvent materials, for instance from the ketone group of solvents such as acetone, methyl ethyl ketone, methylisobutyle ketone, cyclohexanone; the alcohol group such as methanol, ethanol, propanol, butanol; the ester group such as methyl acetate, ethyl acetate, butyl acetate, ethyl lactate, glycol acetate monoethyl ether; the glycol ether group such as ether, glycol dimethylether, glycol monoethyl ether, dioxane; aromatic hydrocarbons such as benzene, toluene, xylene; chlorinated hydrocarbons such as methylene chloride, ethylene chloride, carbon tetrachloride, chloroform, ethylene chlorohydrin, dichloro benzene. One skilled in this art will select a solvent or solvent system that is compatible with the other components of the magnetic paint and achieves the result desired.

The dispersing agent may be a fatty acid having from 12 to 18 carbon atoms such as caprylic acid, capric acid, lauric acid, myristic acid, palmitic acid, stearic acid, oleic acid, elaidic acid (9-octadecenoic acid), linoleic acid, linolenic acid, stealoric acid ($R_1$ COOH, wherein $R_1$ is alkali group having 11 to 17 carbon atoms); a metallic soap made of said alkali metal of fatty acid (Li, Na, K, etc.) or alkaline earth metals (Mg, Ca, Ba); or lecithin. A higher alcohol having 12 or more carbon atoms or an ester sulfate may be used. The amount of the dispersing agent is from 1 to 20 parts by weight calculated on 100 parts by weight of binder.

An anti-static agent is optionally included in the magnetic paint composition, depending upon the intended use of the resulting media. Suitable anti-static agents include graphite powder, carbon black, carbon black graft polymer; a natural surfactant such as saponin; a nonionic alkylene oxide, glycerine glycidol surfactant, etc.; cationic surfactants such as higher alkyl amines, quaternary ammonium salts, pyridine and other heterocyclic compounds, phosphonium or sulfonium; an anionic surfactant including an acid group such as carboxylic acid, sulfonic acid, phosphoric acid, sulfuric ester group, and phosphoric ester group, amphoteric surfactants such as amino acids, aminosulfonic acid, sulfuric or phosphoric esters of amino alcohol.

These surface active agents may be used alone or mixed. Although they are mainly used as antistatic agents, they may also be used for other purposes such as improved dispersion of the magnetic particles, improved magnetic properties, improved lubrication, or as auxiliary coating agents.

The abrasives used herein may be, for instance, molten alumina, solicon carbide, chromium oxide, corundum, artificial corundum, diamond, synthetic diamond, garnet, emery, etc.

The lubricant used herein may be silicone oil, carbon black, graphite, carbon black graft polymer, molybdem disulfide, tansten disulfide, aliphatic esters of monobasic resin acid of 12 to 16 oxygen atoms and monovalent alcohol of 3 to 12 carbon atoms, fatty acid ester of monobasic resin acid of 17 or more carbon atoms and a monovalent alcohol having the total number of 21 to 23 carbon atoms when added to the number of carbon atoms of the resin acid. These lubricants may be added to 100 parts by weight of the binder in an amount of 0.2 to 20 parts by weight.

The magnetic powder, glasslike carbon powder, dispersing agent and/or solvent are kneaded before use as a magnetic coating agent. Either each or all of these ingredients are consecutively or all at once placed into a kneader. For instance, the magnetic powder is added into a solvent containing a dispersing agent and kneaded for a predetermined time, then other components are added and the mass again kneaded to obtain a magnetic paint.

Various types of kneaders known in the art may be used for mixing and kneading. They may be a two-roll mill, a three-roll mill, a ball mill, a pebble mill, a trommel, a sand grinder, a Szegvari attoriter, a high-speed impellar breaker, a high-speed stone mill, a high-speed impact mill, a disperser, a kneader, a high-speed mixer, a homogenizer, a supersonic disperser, or the like.

The method of applying the magnetic paint on a non-magnetic substrate may be air/doctor knife coating, blade coating, air knife coating, squeeze coating, impregnation coating by an applicator, reverse roll coating, transfer roll coating, gravure coating, kiss coating, cast coating, spray coating, etc. Other coating methods are also possible, and for concrete description of such methods, reference should be made to "Coating Engineering" published by Asakura Shoten pp. 253–277, Mar. 20, 1971 (in Japanese).

Materials suitable for the non-magnetic substrate may be polyesters such as polyethylene terephthalate, polyethylene-2,6-naphthalate; polyolefins such as polypropylene; cellulose derivatives such as cellulose triacetate, cellulose diacetate; plastics such as polycarbonate; non-magnetic metals such as Cu, Al, Zn; or ceramics such as glass, porcelain, and earthenware.

The thickness of such non-magnetic substrate is about 3–100 μm and preferably 5–50 μm in the case of films and sheets while the thickness is 0.5–10 μm in the case of disks or cards. The substrate shape may be a drum or cylindrical, but shapes may be chosen arbitrarily according to the recorder to which the recording medium is applied.

The glasslike carbon used herein has an average particle diameter of 0.1–2.0 μm. A magnetic recording medium made of glasslike carbon of less than 0.1 μm diameter is not desirable in that the magnetic powder tends to peel off from the coated layer and damage the magnetic head, although it enhances surface flatness of the layer. On the other hand, if the diameter exceeds 2 μm, wear and tear on the magnetic head will be accelerated.

The quantity of the glasslike carbon used herein in the finished product is preferably in the range of from 0.5–15 parts by weight calculated on 100 parts by weight of the magnetic powder. If the amount is less than 0.5 μm, the effect of the addition of the glasslike carbon is not observed while if it is higher than 15, the magnetic head is worn faster.

The magnetic recording medium according to the present invention has been described in detail above. The preparation of a magnetic medium in tape form will now be explained, for purposes of illustration, in the examples that follow. It will be understood that this invention is by no means limited to magnetic tapes, but is also applicable to magnetic discs, magnetic drums or other media which are similar in principle to magnetic tapes.

The magnetic recording medium according to this invention can be used for data processors, video devices, acoustic devices, etc. Information can be recorded either in digital or analog.

As described above, the magnetic recording medium according to this invention is superior in anti-abrasion and lubrication properties in magnetic coated layers, is less likely to damage magnetic heads with which it comes into contact, and can endure and be used over a long period of time without deterioration in the magnetic characteristics.

The present invention will now be further described with reference to the following nonlimiting examples. Unless otherwise indicated in the following examples and in the appended claims, all parts and percentages are by weight.

(1) Preparation of Magnetic Paint 200 parts by weight of mixed solvent, which consists of 100 parts by weight of methyl ethyl ketone and 100 parts by weight of cyclohexane, were added to a mixture of:

| | |
|---|---|
| Co coated $\gamma$-Fe$_2$O$_3$ | 100 parts by weight |
| Binder | 25 parts by weight |
| dispersing agent | 1.5 parts by weight |
| conductive carbon black | 5 parts by weight |
| abrasive | in the amount shown in the following table |
| lubricant | |
| vitreous, glasslike carbon | |

The mixture was mixed and kneaded in a ball mill for 24 hours to obtain a magnetic paint.

The Co coated $\gamma$-Fe$_2$O$_3$ used above is 1.0 μm along the long axis of the particle and 0.2 μm in the short axis. The binder, the commercial name is VAGH available from Union Carbide, USA, is a mixture of copolymers of vinyl chloride and vinyl acetate and polyurethane resin, the commercial name is N-2304 available from Nippon Polyurethane Kogyo Kabushiki Kaisha, Japan, is mixed in the ratio of 1:1 parts by weight. The dispersing agent used is lecithin. The conductive carbon black used is CONDUCTEX SC (commercial name) available from Colubian Carbon Japan Co., Ltd., and the abrasive used is $\alpha$-Al$_2$O$_3$ containing more than 60 weight % of particles 0.5–1.1 μm in diameter. The lubricant is butyl myristate. The glasslike carbon used for experiments 1, 2, 3 and 9 were glasslike carbon of furan origin; those used for experiments 4, 5, and 11 were of phenol origin; those used for experiments 6 and 7 were polyacrylonitrile. In each of these examples, the glasslike carbon mass was roughly crushed in a hammer mill, then finely pulverized in a jet mill and classified in order to obtain glasslike carbon of the desired diameter.

(2) Manufacture of the Magnetic Recording Medium

The magnetic paint thus obtained was coated on a polyester film by an applicator to a wet thickness of 30 μm, given magnetic field orientation, dried with hot air, flattened on the coated surface with a calender and finally slit into ½ inch width strips to obtain a magnetic recording medium (hereinafter referred to as a magnetic tape) for video recording.

(3) Evaluation of the Magnetic Tape

The magnetic tape obtained as described above was tested using a VHS system video tape recorder in an atmosphere of 20° C. (68° F.) and 50% R.H. (relative humidity) and in an atmosphere of 5° C. (41° F.) and 80% R.H. The tape was evaluated on the following three points:

(a) Head wear—The wear of the VHS magnetic head was measured after a 100-hour run of the tape. This is expressed as the decrease of head length.

(b) Still image—This is expressed by the number of hours elapsed before a picture image becomes disturbed after it is reproduced as a still image from a recorded magnetic tape with 50 g tension on the reel-out side. The time is up to 120 minutes.

(c) Conditions of the head after the still image (b) test—The conditions of the head after being evaluated for the above still image test were visually observed.

(d) Magnetic characteristics (rectangular ratio)—The rectangular ratio was measured for the tape of this invention and for comparative tapes. The tape of this invention is almost similar to the magnetic characteristics of comparative tapes.

The amounts of vitreous, glasslike carbon, abrasive and lubricant reported in the following table are calculated on 100 parts by weight (sometimes expressed as parts per hundred or phr) of Co-coated magnetic particles.

The results of above tests and evaluations are listed on the following table. In the measurement and reporting of head conditions, O represents good, Δ slightly inferior, and X inferior. Parenthetical comments are provided on particularly inferior or defective items.

TABLE

| Experiment Number | Amount of vitreous, glass-like carbon added (phr) | vitreous carbon diameter (μm) | Amount of Abrasive (phr) | Amount of Lubricant (phr) | 20° C. 50% R.H. head wear (μm) | 20° C. 50% R.H. still image (minutes) | 20° C. 50% R.H. head cond. | 5° C. 80% R.H. head wear (μm) | 5° C. 80% R.H. still image (minutes) | 5° C. 80% R.H. head cond. | Magnetic Property |
|---|---|---|---|---|---|---|---|---|---|---|---|
| this invention tape | | | | | | | | | | | |
| 1 | 5 | 0.1–2.0 | 0 | 0 | 2 | 120 or more | O | 2 | 120 or more | O | 0.84 |
| 2 | 5 | 0.1–2.0 | 5 | 1 | 3 | 120 or more | O | 4 | 120 or more | O | 0.84 |
| 3 | 1 | 0.1–2.0 | 0 | 0 | 2 | 120 or more | O | 2 | 120 or more | O | 0.85 |
| 4 | 1 | 0.1–2.0 | 5 | 1 | 2 | 120 or more | O | 3 | 120 or more | O | 0.85 |
| 5 | 0.5 | 0.1–2.0 | 5 | 1 | 2 | 120 or more | O | 3 | 120 or more | O | 0.85 |
| 6 | 15 | 0.1–2.0 | 0 | 0 | 3 | 118 | O | 2 | 118 | O | 0.82 |
| 7 | 15 | 0.1–2.0 | 5 | 1 | 4 | 116 | O | 3 | 115 | O | 0.82 |
| Comparative tapes | | | | | | | | | | | |
| 8 | 0 | — | 5 | 1 | 6 | 80 | X damage (while) running | 8 | 30 | X damage (while) running | 0.85 |
| 9 | 18 | 0.1–2.0 | 5 | 1 | 4 | 120 or more | Δ | 10 | 80 | X | 0.81 |
| 10 | 25 | 0.1–2.0 | 5 | 1 | 6 | 80 | X | 10 | 60 | X | 0.80 |
| 11 | 5 | 3–10 | 5 | 1 | 6 | 80 | Δ | 8 | 60 | X | 0.83 |
| 12 | 0 | — | 5 | 0 | 10 | 40 | X | 12 | 10 | X | 0.84 |
| 13 | 0 | — | 0 | 1 | 2 | 60 | O | 3 | 20 | O | 0.84 |

What is claimed is:

1. A magnetic recording medium exhibiting reduced abrasion and improved lubricant properties comprising a non-magnetic substrate hagving a magnetic layer containing a magnetic powder thereon, the magnetic layer including a glasslike carbon powder having an average particle diameter of from 0.1 to 2.0 μm present in an amount of from 0.5 to 15 parts by weight per 100 parts by weight of the magnetic powder.

2. The magnetic recording medium as claimed in claim 1 which is a magnetic recording tape.

3. The magnetic recording medium of claim 1 in the form of a disk.

4. The magnetic recording medium of claim 1 in the form of a card.

* * * * *